(12) United States Patent
Herrema et al.

(10) Patent No.: US 11,178,827 B1
(45) Date of Patent: Nov. 23, 2021

(54) GROWING MEDIA

(71) Applicant: Flow-Rite Controls, Ltd., Byron Center, MI (US)

(72) Inventors: Mark W. Herrema, Rockford, MI (US); Timothy J. Miller, Murfreesboro, TN (US)

(73) Assignee: Hydra Unlimited, LLC, Byron Center, MI (US)

( * ) Notice: Subject to any disclaimer, the term of this patent is extended or adjusted under 35 U.S.C. 154(b) by 8 days.

(21) Appl. No.: 16/870,127

(22) Filed: May 8, 2020

(51) Int. Cl.
*A01G 31/02* (2006.01)
*A01G 24/10* (2018.01)
*A01G 24/42* (2018.01)

(52) U.S. Cl.
CPC ............. *A01G 24/10* (2018.02); *A01G 24/42* (2018.02); *A01G 31/02* (2013.01)

(58) Field of Classification Search
CPC ........ A01G 24/10; A01G 31/02; A01G 24/42; A01G 24/00; A01G 24/30; A01G 24/40; A01G 31/00; A61H 15/0092; A01K 15/025; A01K 15/026
See application file for complete search history.

(56) References Cited

U.S. PATENT DOCUMENTS

| | | | | |
|---|---|---|---|---|
| 3,233,365 A | * | 2/1966 | Bergann | A01G 24/40 47/64 |
| 3,835,584 A | | 9/1974 | Shimazu | |
| 4,581,846 A | | 4/1986 | Stensaas | |
| D328,328 S | * | 7/1992 | Juarez | D21/623 |
| D376,015 S | * | 11/1996 | Newberry | D24/211 |
| D396,110 S | * | 7/1998 | Kang | D24/211 |
| D439,378 S | * | 3/2001 | Loomis | D30/160 |
| 10,448,584 B2 | | 10/2019 | Nishimura et al. | |
| 2001/0029904 A1 | * | 10/2001 | Viola | A01K 15/025 119/707 |
| 2010/0005719 A1 | | 1/2010 | Koetsch | |
| 2015/0173306 A1 | | 6/2015 | Torcellini | |
| 2015/0230419 A1 | | 8/2015 | Ishizaka et al. | |

FOREIGN PATENT DOCUMENTS

| | | | | |
|---|---|---|---|---|
| GB | 2398562 A | * | 8/2004 | ............. A01G 24/42 |
| KR | 101768016 B1 | * | 8/2017 | ............. E02B 3/129 |
| WO | 2007106526 A2 | | 9/2007 | |

OTHER PUBLICATIONS

Encyclopaedia Britannica: Jacks (https://web.archive.org/web/20161118213925/https://www.britannica.com/topic/jacks), published Nov. 18, 2016, accessed Jul. 10, 2021. (Year: 2016).*
International Search Report and Written Opinion for International Application No. PCT/US21/18555, dated May 6, 2021.
Hydroponic Growing Media, pp. 1-26, https://www.epicgardening.com/hydroponic-growing-media/, downloaded Mar. 10, 2020.
Photo of other plastic media, at least as early as Jan. 12, 2020.

* cited by examiner

*Primary Examiner* — Kathleen I Alker
(74) *Attorney, Agent, or Firm* — Warner Norcross + Judd LLP

(57) ABSTRACT

A synthetic growing media, such as for a hydroponic growing system, includes a plastic body having multiple legs pointing in different directions. One or more of the legs has a bulbous tip. A synthetic growing medium comprising an aggregate of synthetic growing media and hydroponic system for plant cultivation are also disclosed.

14 Claims, 4 Drawing Sheets

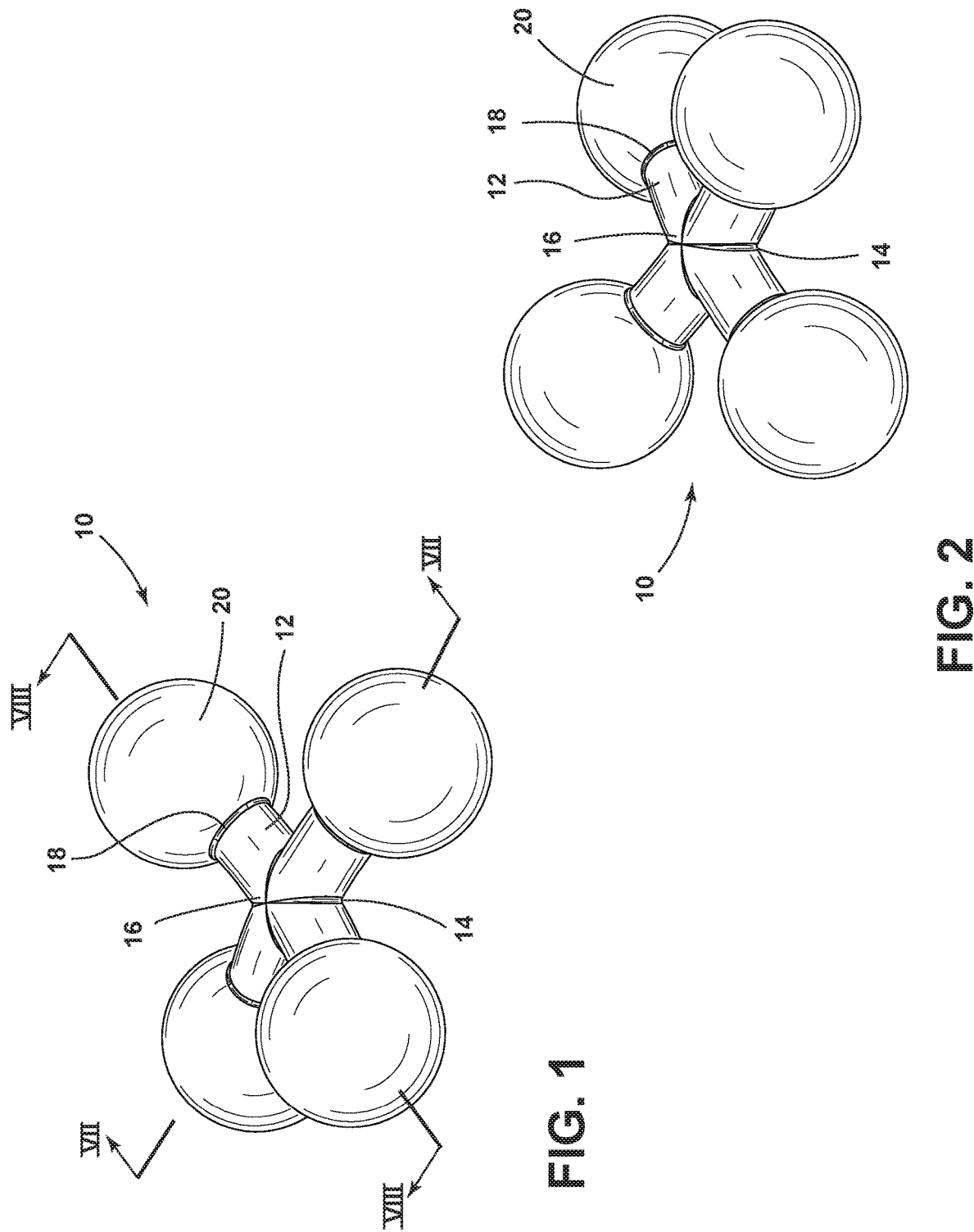

GROWING MEDIA

BACKGROUND OF THE INVENTION

The present invention relates to growing media for plant cultivation, and more particularly to synthetic growing media, including growing media that can be used instead of conventional soils and rock wool in cultivating plants.

Hydroponics is a method of cultivating plants without natural dirt or soil, by instead using mineral nutrient solutions in a water solvent. Plants may be grown with only their roots exposed to the nutritious liquid, or the roots may be physically supported by a growing medium. As the roots of the plant grow, the roots tend to surround the pieces of the media. This not only anchors the plant but also allows the roots to grow outward and absorb nutrients for the plant. In nature, grow media is usually dirt or soil. Benefits of hydroponic systems include increased growth rate, reduced water usage, and reduced labor.

Known growing mediums include expanded clay aggregate and gravel. Such media have several drawbacks. To maximize the yield from a plant, the nutrients levels of the nutritious liquid in which the plants are grown are closely controlled. A common method for monitoring the nutrient level is measuring the pH of the liquid. As plant roots grasp the expanded clay or gravel, the media breaks down, which can change the overall nutrient composition and pH of the liquid as the chemical makeup of the growing media dissolves, negatively affecting the plant growth.

In addition, the shape of the growing media can be problematic. Expanded clay and gravel tend to be irregular spheroids. Because these growing media are spherical in nature, the expanded clay and gravel can slip pass each other with ease, and do not create a stable foundation for the plant roots. This means the plant root must grow through the expanded clay or gravel and into another substrate, such as a mesh basket, before the plant can remain upright.

Lastly, growing media such as expanded clay and gravel are often porous. Plant roots and bacteria can grow in the pores of the growing media. This makes cleaning the growing media so difficult that it is common for the growing media is used only during one grow cycle and then discarded.

Other known growing mediums include rock wool, growstones made from glass waste, perlite, coconut coir, rice husks, vermiculite, pumice, gravel, and polystyrene packing peanuts. These growing media can also present obstacles with respect to the nutritious liquid, root stability, and recyclability.

SUMMARY OF THE INVENTION

The aforementioned challenges are overcome by a synthetic growing media of the present invention.

In one embodiment, a synthetic growing media includes a one-piece plastic body comprising a plurality of legs emanating from a common center and pointing in different directions, at least one of the plurality of legs comprising a proximal end which connects to the common center and a distal end which includes a bulbous tip, the bulbous tip having a major dimension greater than a width of the at least one of the plurality of legs.

In another embodiment, a hydroponic growing system including a synthetic growing medium comprising an aggregate of synthetic growing media is provided.

In yet another embodiment, a synthetic growing medium comprising an aggregate of synthetic growing media is provided.

These and other features and advantages of the invention will be more fully understood and appreciated by reference to the entire application including the specification, claims, and drawings.

BRIEF DESCRIPTION OF THE DRAWINGS

FIG. 1 is a top perspective view of one embodiment of a synthetic grow media for an aggregate growing medium;

FIG. 2 is a bottom perspective view of the grow media from FIG. 1;

DETAILED DESCRIPTION

Figure 3:
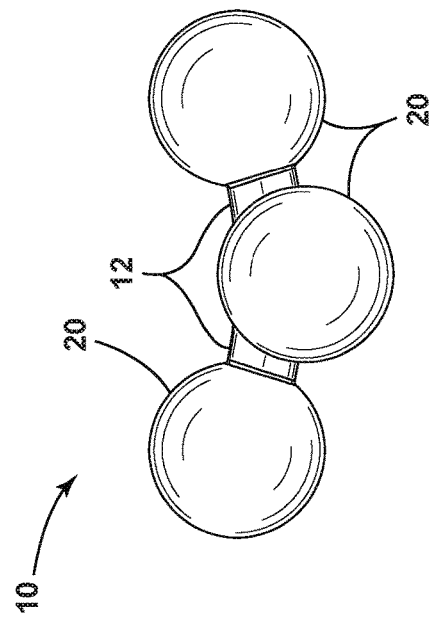
FIG. 3 is a top view of the grow media from FIG. 1.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. In addition, it is to be understood that the phraseology and terminology used herein are for the purpose of description and should not be regarded as limiting. The use of "having," "including," and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Referring now to the drawings and to FIGS. 1-2. 1 in particular, a synthetic growing media 10 according to a first embodiment of the invention is shown. The synthetic growing media 10 includes multiple protruding parts or legs 12 emanating from a common center or nexus 14 pointing in different directions. In the embodiment shown, the growing media 10 can more specifically have a tetrapod-like shape, i.e. a shape having four protruding parts or legs 12 emanating from a nexus 14 pointing in four different directions. The shape of the growing media 10 allows the individual media to entangle with other media in a confined space, such as a growing tray or a net basket common in hydroponics, without interlocking. This provides a stable foundation for a plant's root system in which to anchor, while providing the gaps necessary for root growth. The synthetic growing media 10 can be used with various hydroponic systems, including wick, deep water culture, nutrient film technique, ebb and flow (e.g. flood and drain), and drip systems.

Each leg 12 has two ends, a proximal end 16 that connects to the nexus 14, and a distal end 18 comprising a free end of the leg 12. The nexus 14 is the core or center at which the legs 12 interconnect. Each of the legs 12 extends outwardly from the nexus 14 in a different direction, i.e. toward a different point in space. A tip 20 is disposed at each of the distal ends 18. One of more of the tips 20 preferably has a bulbous shape, as described in detail below.

Referring additionally to FIGS. 3-6, the legs 12 can have a cylindrical shape. As used herein, the term "cylindrical shape" refers to a columnar shape having a circular cross section (which may be either in the form of a perfect circle or an oval) in a direction perpendicular to an axial direction of the leg 12, i.e. the direction the leg 12 extends between the proximal end 16 and the distal end 18. The cross-section of the leg 12 can remain constant from the proximal end 16 to the distal end 18, or may change. In an alternative embodiment, one or more of the legs 12 can have a tapered or frustoconical shape, such as being tapered toward the toward the distal end 18 of the leg 12. Other columnar shapes for the legs 12 are possible, including triangular, quadratic, hexagonal, octagonal, or other prismatic shapes. In the embodiment shown in FIG. 1-8, each leg 12 has substantially the same shape. In an alternative embodiment, one or more of the legs 12 may have a different shape.

In the embodiment shown in FIG. 1-8, the legs 12 have an identical or similar length L measured along an axial direction X of the leg 12, i.e. measured from the proximal end 16 and the distal end 18. The legs 12 can have a leg length L of 0.185 inches (about 4.7 mm). In an alternative embodiment, the length of one or more of the legs 12 is different than the length of one or more of the other legs 12.

In the embodiment shown in FIG. 1-8, the legs 12 have an identical or similar width W measured perpendicular to an axial direction X of the leg 12, i.e. the direction the leg 12 extends between the proximal end 16 and the distal end 18. The legs 12 can have a leg width W of 0.15 inches (about 3.81 mm). In an alternative embodiment, the width of one or more of the legs 12 is different than the width of one or more of the other legs 12.

The tips 20 are disposed at the distal end 18 of each leg 12. The tips 20 can be spherical, and form a ball-shaped body on the distal end 18. The tips 20 can have a variety of shapes, and are not limited to the spherical geometries illustrated. For example, the tips 20 may be spheroidical, or ellipsoidical, like a ball or an egg, hemispherical, semispherical, or have yet other rounded or bulbous shapes. Still other alternatives are possible. For example, the tip 20 of one or more of the leg 12 can have a truncated cone shape, which is tapered toward the distal end thereof.

Although the tips 20 are not limited to any particular shape, at least one of the tips 20 is preferably bulbous, and the bulbous shape defines a major dimension D that is greater than the width W of its associated leg 12, i.e. the leg 12 on which the tip 20 is disposed. In other words, the thickness of the bulbous tip 20 is greater than that of the leg 12. As used herein, the term "major dimension" refers to the largest measurement that can be taken across the tip 20 in one direction, and defines the overall size of the tip 20. Depending on the shape of the tip 20, the major dimension D may be a diameter, width, height, or length. For a spherical tip 20 as shown in FIGS. 1-8, the major dimension is the diameter D of the tip 20. In one embodiment, the diameter D of the tip 20 can be on the order of 2× the leg width W. In one embodiment, the tip 20 can have a diameter D of 0.38 inches (about 9.65 mm).

Figure 7:
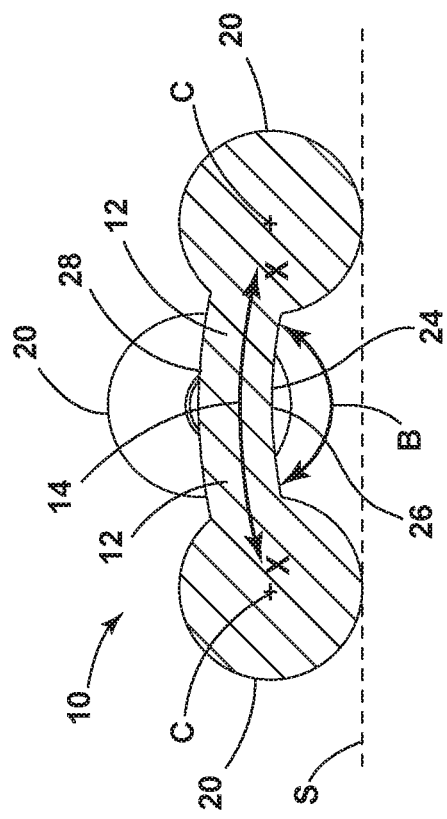
FIG. 7 is a cross-sectional view of the grow media, taken through line VII-VII of FIG. 1.
Figure 8:
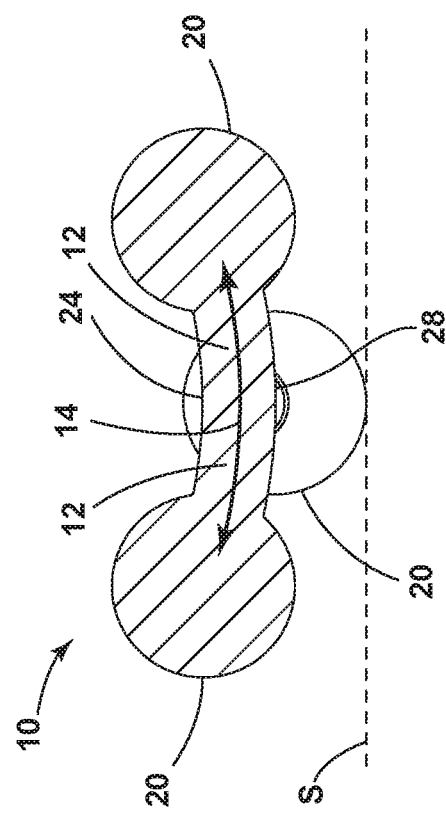
FIG. 8 is a cross-sectional view of the grow media, taken through line VIII-VIII of FIG. 1.

It is noted that the bulbous tip 20 is thicker than the leg 12 in at least one plane passing through the leg 12 and the center of the tip 20, for example, a plane in which the major dimension D is measured as shown in the cross-sectional view of FIGS. 7-8. In some embodiments, the tip 20 may be equal to or less than the thickness of the leg 12 in a different plane passing through the leg 12 and the center of the tip 20.

The major dimension D can be greater than the length L of its associated leg 12, i.e. the leg 12 on which the tip 20 is disposed. In one embodiment, the diameter D of the tip 20 can be on the order of 1.25× the leg length L, alternatively 1.33× the leg length L, alternatively 1.5× the leg length L.

The growing media 10 is manufactured from a synthetic material, such as plastic. Some non-limiting examples of suitable plastic for the growing media include polypropylene and acrylonitrile butadiene styrene (ABS). This material does not breakdown in the presence of water. Therefore, it will not change the chemical makeup of the nutritious liquid in the hydroponic system.

The growing media 10 can more specifically be manufactured from a non-porous plastic material, such as polypropylene or ABS as previously mentioned. As used herein with respect to the growing media, the term "non-porous" refers to materials that air and liquid cannot pass through. If bacteria or other non-desirable organic growths were to grow on the growing media 10, the non-porous material prevents the foreign growths from penetrating the surface of the growing media 10. Such foreign growths can be removed from or killed on the surface of the growing media using standard cleaning techniques since plastic material is insert to most common cleaning products, including hydrogen peroxide and bleach. This allows the synthetic growing media 10 to be reused and/or recycled.

In some embodiments, an antibacterial, antimicrobial, or biocide additive can be added to the plastic during the manufacturing process to also aid in the cleanability, and to protect the growing media 10 from bacteria, algae, fungi, and/or mold. Such additives can be added during an injection molding process or other manufacturing process. Examples of suitable additives for the plastic growing media 10 include, but are not limited to, 10', 10'-oxybisphenox arsine, 2-n-octyl-4-isothiazolin-3-one, and dichloro-2-n-octyl-4-isothiazolin-3-one. Biocide products containing tributyl tin, silver, and silver compounds are also effective.

Each growing media 10 is a one-piece body manufactured, for example, via injection molding or additive manufacturing, e.g. 3-D printing. In one example, the growing media 10 is a plastic injection molded structure. In another example, the growing media 10 is a 3D printed structure having multiple layers of plastic material deposited by an additive manufacturing machine.

Figure 4:
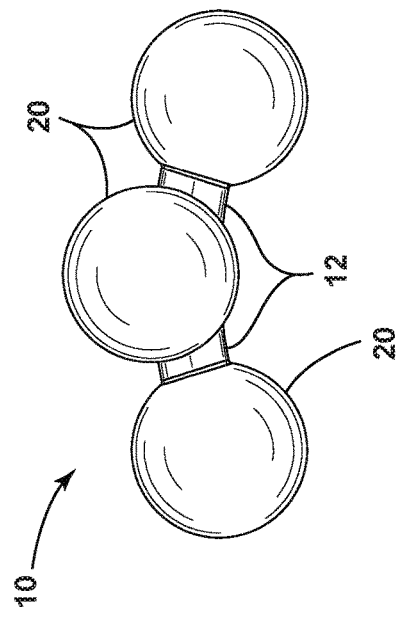
FIG. 4 is a bottom view of the grow media from FIG. 1.
Figure 5:
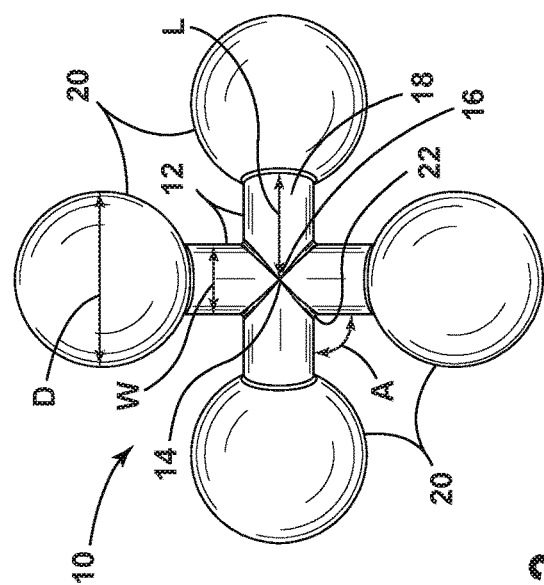
FIG. 5 is a right side view of the grow media from FIG. 1.
Figure 6:
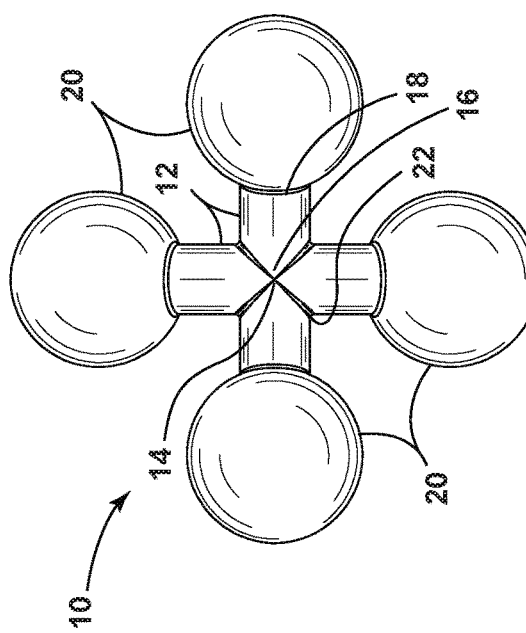
FIG. 6 is a front view of the grow media from FIG. 1.

Referring to FIGS. 3-4, in the embodiment shown the growing media 10 has four legs 12 and is generally in the shape of a cross or "X" when viewed from above (FIG. 3) or below (FIG. 4). In alternative embodiments, the growing media 10 can have more than four legs or less than four legs.

For example, the growing media 10 can have six legs. In one six-legged embodiment, the growing media can have four legs 12 with spherical tips 20, and two legs 12 with pointed tips, similar to a jack. In another embodiment, the growing media 10 can have a least two legs 12, alternatively at least three legs 12, emanating from common center 14 and pointing in different directions. In any of the aforementioned embodiments, one or more of the legs 12 can have a bulbous tip 20 and one more of the legs 12 can have a non-bulbous tip 20.

As noted above, with the four-legged embodiment shown in the figures, the growing media 10 has a tetrapod-like shape. The legs 12 are disposed such that less than all of the legs 12 may contact a relatively flat or planar surface, such as surface S shown in FIGS. 7-8, at a time. One or more of the other legs 12 is offset from the surface S. The legs 12 can alternate to point up and down can so that no matter how the growing media 10 is placed on a relatively flat surface, such as surface S shown in FIGS. 7-8, two of the legs 12, and more specifically the tips 20 of an opposing pair of the legs 12, will form a support and the other opposing pair of legs 12 will point upward, away from the surface S. Thus, the two opposing pairs of legs 12 are offset in different directions so that they do not contact a common surface S. The opposing legs 12 can be diametrically opposing legs having an identical leg length L such that the growing media 10 can symmetrically engage a surface S.

Adjacent legs 12 are joined together at a joint 22. When viewed from above (FIG. 3) or below (FIG. 4), the adjacent legs 12 enclose an included angle A on the inside of the joint 22. For the cross or X-shaped body shown, the included angle A can be approximately 90 degrees. This spacing can allow the tip 20 of one growing media 10 to nest between adjacent legs 12 of another growing media 10. For example, the tip 20 of one growing media 10 can nest in the joint 22 of another growing media 10.

When viewed in cross-section (FIG. 7-8), opposing legs 12 are joined together at the node 14. The opposing legs 12 enclose an included angle B on a first side 24 of the node 14, measured at a vertex 26 between the legs 12 on the first side 24. For the growing media 10 shown, the included angle B can be less than 180 degrees, alternatively an obtuse angle less than 180 degrees and greater than 90 degrees.

In the embodiment shown, the first included angle A is in a first plane, and the second included angle B is taken in a second plane orthogonal to the first plane. The second plane is defined by the cross-section of FIG. 7 or FIG. 8, both of which are orthogonal to the first plane and to the top and bottom views of FIGS. 3-4. Other orientations are possible.

The legs 12 can be curved, and can form a concave contour on a first side thereof and a convex contour on second side thereof. The first side 24 of the node 14 can form a concave contour, with the legs 12 extending from the node 14 on the first side 24 continuing the concave contour. On an opposing second side 28 of the node 14, which can be a side opposing the first side, the growing media 10 forms a convex contour, with the legs 12 extending from the node 14 on the second side 28 continuing the convex contour. The curved legs 12 can minimize stress concentration at the distal ends 18 or tips 20 of the legs. In an alternative embodiment, the opposing legs 12 can form an angle on one or both of the opposing sides 24, 28, rather than a curve, in the region of the node 14.

When viewed from the side (FIGS. 5-6) or in cross-section (FIG. 7-8), the tip 20 can at least partially overlap each other, which makes the overall shape of the growing media more compact, with a low profile. For example, the major dimension D, e.g. diameter in the embodiment shown in FIGS. 1-8, of opposing tips can partially overlap that of the adjacent tips.

In the embodiment shown in FIG. 1-8, a center C of the spherical tips 20 can be equidistant from the node 14. In an alternative embodiment, the center C of one or more of the tips 20 can be closer to or further from the node 14 than the center of at least one other tip 20.

Figure 9:
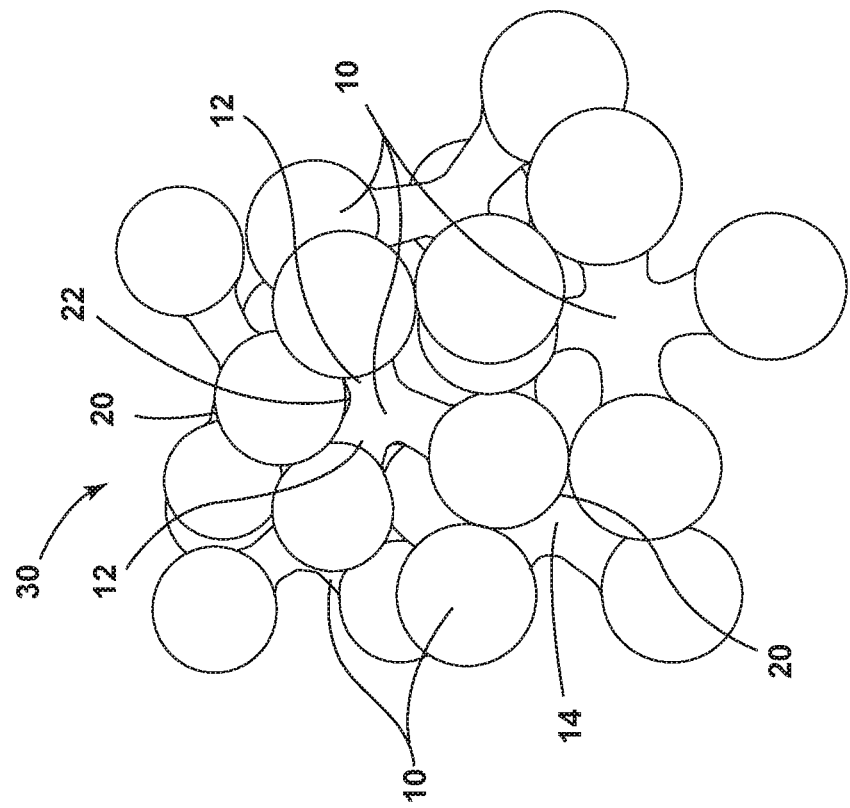
FIG. 9 is a perspective view of one embodiment of an aggregate growing medium comprising a plurality of the synthetic grow media of FIG. 1.

FIG. 9 is a view of an aggregate growing medium 30 comprising a plurality of the synthetic growing media 10 of FIG. 1. When grouped, the aggregate growing medium forms a stable foundation having a porous structure configured for cultivating plants. The porous structure is comprised of the irregularly arranged growing media 10 and the spaces therebetween that form interconnected pores. The growing media 10 can be randomly arranged in irregular and/or offset orientations, for example with one growing media 10 being rotated in orientation with respect to adjacent growing media 10, and growing media 10 in one layer being offset with respect to growing media 10 in layers above or below.

The shape of the growing media 10 allows the individual media 10 to entangle with other media 10 in a confined space, such as a growing tray or a net basket (not shown) without interlocking. Various entanglements are possible. For example, the tip 20 of one growing media 10 can nest between adjacent legs 12 of another growing media 10 or more specifically in the joint 22 of another growing media 10. In another example, the tip 20 of one growing media 10 can rest atop the nexus 14 of another growing media 10.

An exemplary appearance of the aggregate growing medium 30 is shown in FIG. 9. It is understood that the number, orientation, and layering of the growing media 10 for the aggregate growing medium 30 may be formed in various ways depending on the conditions.

The present disclosure also provides a hydroponic system for plant cultivation including the synthetic growing media 10 described herein. The hydroponic system is not particularly limited as long as it includes the synthetic growing media 10 described herein, and can include the structure of a conventionally known hydroponic system including a wick, deep water culture, nutrient film technique, ebb and flow (e.g. flood and drain), or drip system.

Figure 10:
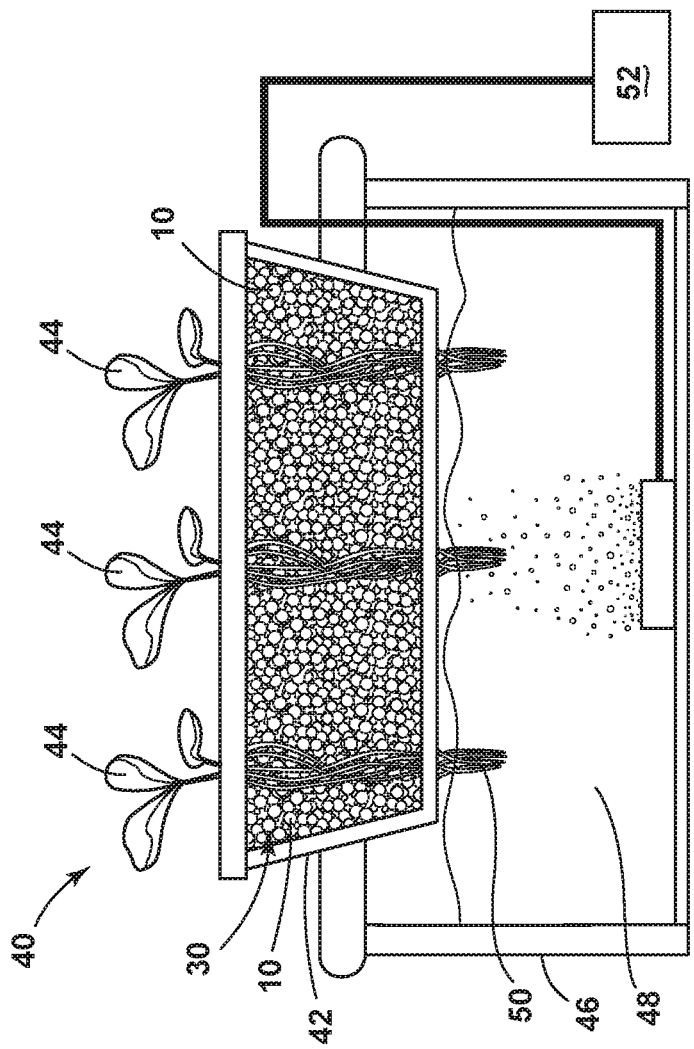
FIG. 10 is a schematic view of one embodiment of a hydroponic system comprising a plurality of the synthetic grow media of FIG. 1 as an aggregate growing medium.

FIG. 10 is a schematic view of one embodiment of a hydroponic system 40 comprising a plurality of the synthetic grow media 10 of FIG. 1 as the aggregate growing medium 30. The hydroponic system 40 includes a growing container 42 holding the aggregate growing medium 30. The growing container 42 may be a tray, net basket, pot, or any other suitable container for holding the growing media 10 and supporting the growth of plants 44.

Plants 44 are supported in the container 42 above a reservoir 46 of nutritious liquid 48, with only the roots 50 of the plants 44, or the tips of the roots 50, extending into the nutritious liquid 48. An air pump 52 can bubble air through the nutritious liquid 48 to provide oxygen to the roots 50. Optionally, the hydroponic system 40 can include a recirculation system for delivering liquid from the reservoir 46 to multiple containers 42 using pumps (not shown). One example of a suitable recirculation system is disclosed in U.S. Patent Application Publication No. 2020/0045899, published Feb. 13, 2020, which is incorporated herein by reference in its entirety.

There are several advantages of the present disclosure arising from the various aspects or features of the apparatus, systems, and methods described herein. For example, aspects described above provide an improved artificial growing media for plant cultivation. The non-spherical shape of the growing media 10 allows the individual media to entangle with other media and provides a stable foundation for plant root systems, while providing the gaps necessary for root growth.

Another advantage of aspects of the disclosure relates to the recyclability/reusability of the growing media. The synthetic growing media can comprise a non-porous plastic material that can be easily cleaned using standard cleaning techniques, allowing the growing media to be reused for multiple growing cycles.

Yet another advantage of aspects of the disclosure is that the synthetic growing media does not breakdown in the presence of water. Plant roots can grasp the legs and tips of the growing media without breaking down the growing media. The growing media remains intact and does not affect the pH of the nutritious liquid, making it easier to optimize plant growth.

Still another advantage of aspects of the disclosure is that a hydroponic system comprising a plurality of the synthetic grow media with the aforementioned advantages is provided.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language that defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

Terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially," "about," and "approximately" are utilized herein to represent the inherent degree of uncertainty that may be attributed to any quantitative comparison, value, measurement, or other representation. The terms "substantially," "about," and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

The invention claimed is:

1. A hydroponic system for plant cultivation comprising:
a synthetic growing medium comprising an aggregate of synthetic growing media, the synthetic growing media comprising a one-piece plastic body comprising at least four legs spaced from each other in a first plane, the legs emanating from a common center and pointing in different directions, at least one of the legs comprising a proximal end which connects to the common center and a distal end which includes a bulbous tip, the bulbous tip having a major dimension greater than a width of the at least one of the legs, an opposing pair of the legs spaced less than 180 degrees from each other in a second plane that is orthogonal to the first plane.

2. The hydroponic system of claim 1, wherein the bulbous tip comprises a spherical tip having a diameter greater than the width of the at least one of the legs.

3. The hydroponic system of claim 2, wherein the spherical tip comprises a ball-shaped tip.

4. The hydroponic system of claim 1, wherein each of the legs comprises a proximal end that connects to the common center and a distal end that includes a bulbous tip.

5. The hydroponic system of claim 1, wherein the legs are the same length.

6. The hydroponic system of claim 1, wherein the one-piece plastic body comprises one of polypropylene and acrylonitrile butadiene styrene.

7. The hydroponic system of claim 1, wherein the one-piece plastic body comprises a non-porous plastic material.

8. The hydroponic system of claim 1, wherein the pair of the legs are curved, forming a concave contour on a first side and a convex contour on an opposing second side.

9. A hydroponic system for plant cultivation comprising:
a synthetic growing medium comprising an aggregate of synthetic growing media, the synthetic growing media comprising a one-piece plastic X-shaped body comprising four legs spaced approximately 90 degrees from each other in a first plane, the legs emanating from a common center and pointing in different directions, at least one of the legs comprising a proximal end which connects to the common center and a distal end which includes a bulbous tip, the bulbous tip having a major dimension greater than a width of the at least one of the legs, an opposing pair of the legs spaced less than 180 degrees from each other in a second plane that is orthogonal to the first plane.

10. A synthetic growing media for plant cultivation comprising:
a one-piece plastic body comprising at least four legs spaced from each other in a first plane, the legs emanating from a common center and pointing in different directions, at least one of the legs comprising a proximal end which connects to the common center and a distal end which includes a bulbous tip, the bulbous tip having a major dimension greater than a width of the at least one of the legs, an opposing pair of the legs spaced less than 180 degrees from each other in a second plane that is orthogonal to the first plane.

11. The synthetic growing media of claim 10, wherein the bulbous tip comprises a spherical tip having a diameter greater than the width of the at least one of the legs.

12. The synthetic growing media of claim 10, wherein the one-piece plastic body comprises one of polypropylene and acrylonitrile butadiene styrene.

13. The synthetic growing media of claim 10, wherein the one-piece plastic body comprises a non-porous plastic material.

14. A synthetic growing media for plant cultivation, comprising:
a one-piece plastic X-shaped body comprising four legs spaced approximately 90 degrees from each other in a first plane, the legs emanating from a common center and pointing in different directions, at least one of the legs comprising a proximal end which connects to the common center and a distal end which includes a bulbous tip, the bulbous tip having a major dimension greater than a width of the at least one of the legs, an opposing pair of the legs spaced less than 180 degrees from each other in a second plane that is orthogonal to the first plane.

* * * * *